United States Patent
Lee (10) Patent No.: US 9,590,770 B2
(45) Date of Patent: *Mar. 7, 2017

(54) METHOD OF HANDLING HYBRID AUTOMATIC REPEAT REQUEST FEEDBACK AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 145 days.

This patent is subject to a terminal disclaimer.

(21) Appl. No.: 13/831,947

(22) Filed: Mar. 15, 2013

(65) Prior Publication Data

US 2013/0265949 A1   Oct. 10, 2013

Related U.S. Application Data (60) Provisional application No. 61/622,021, filed on Apr. 10, 2012, provisional application No. 61/643,361, filed on May 7, 2012.

(51) Int. Cl.
*H04L 1/18* (2006.01)

(52) U.S. Cl.
CPC .......... *H04L 1/1812* (2013.01); *H04L 1/1854* (2013.01); *H04L 1/1861* (2013.01); *H04L 1/18* (2013.01)

(58) Field of Classification Search
CPC ... H04L 1/1861; H04L 1/1812; H04L 1/1854; H04L 5/0055; H04L 1/18

(Continued)

(56) References Cited

U.S. PATENT DOCUMENTS

2010/0208679 A1   8/2010   Papasakellariou
2011/0176461 A1   7/2011   Astely
(Continued)

FOREIGN PATENT DOCUMENTS

CN   102045763 A   5/2011
CN   102202400 A   9/2011
(Continued)

OTHER PUBLICATIONS

Email Rapporteur (CMCC), Email summary on inter-band TDD CA, 3GPP TSG-RAN WG1 #69, R1-122708, May 21-25, 2012, XP050601167, Prague, Czech Republic.
(Continued)

*Primary Examiner* — Habte Mered
*Assistant Examiner* — Rownak Islam
(74) *Attorney, Agent, or Firm* — Winston Hsu; Scott Margo (57) ABSTRACT

A method of handling a hybrid automatic repeat request (HARQ) feedback in a subframe for a first communication device in a wireless communication system comprises determining whether the HARQ feedback exists in a physical HARQ indicator channel (PHICH) in a downlink (DL) control region of the subframe transmitted by a network of the wireless communication system according to a first uplink (UL)/DL configuration of the first communication device and a second UL/DL configuration of a second communication device in the wireless communication system communicating with the network; detecting the HARQ feedback in the PHICH of the subframe, if the HARQ feedback exists in the PHICH; and detecting the HARQ feedback in an enhanced PHICH (ePHICH) of the subframe, if the HARQ feedback does not exist in the PHICH.

14 Claims, 9 Drawing Sheets

(58) Field of Classification Search
USPC .................................... 370/329, 310, 328
See application file for complete search history.

(56) References Cited

U.S. PATENT DOCUMENTS

| | | | |
|---|---|---|---|
| 2011/0176502 A1 | 7/2011 | Chung | |
| 2012/0026935 A1* | 2/2012 | Park et al. | 370/315 |
| 2012/0257554 A1 | 10/2012 | Kim | |
| 2013/0039299 A1* | 2/2013 | Papasakellariou et al. | 370/329 |
| 2013/0083740 A1 | 4/2013 | Eriksson | |
| 2013/0188569 A1* | 7/2013 | He | H04W 28/16 370/329 |
| 2013/0194980 A1* | 8/2013 | Yin | H04L 1/1854 370/280 |
| 2013/0201926 A1* | 8/2013 | Nam et al. | 370/329 |
| 2013/0235821 A1* | 9/2013 | Chen | H04W 72/0406 370/329 |
| 2013/0242799 A1 | 9/2013 | Yin | |
| 2014/0016589 A1 | 1/2014 | Kang | |
| 2014/0161004 A1* | 6/2014 | Wang et al. | 370/281 |

FOREIGN PATENT DOCUMENTS

| | | |
|---|---|---|
| CN | 103368711 A | 10/2013 |
| TW | 201215031 | 4/2012 |
| TW | 201325172 | 6/2013 |
| TW | 201342843 | 10/2013 |
| WO | 2010074498 A2 | 7/2010 |
| WO | 2011078581 A2 | 6/2011 |
| WO | WO 2013/113155 * 8/2013 | ............ H04L 1/18 |
| WO | WO 2013/149390 * 10/2013 | ............ H04L 1/18 |

OTHER PUBLICATIONS

Renesas Mobile Europe Ltd., HARQ Procedure for Full Duplex Mode in CC specific TDD configuration, 3GPP TSG-RAN WG1 Meeting #67, R1-113888, Nov. 14-18, 2011, XP050561969, San Francisco, CA, USA.

Huawei, Hisilicon, Cross-carrier scheduling design for TDD inter-band CA with different UL-DL configurations, 3GPP TSG RAN WG1 Meeting #68, R1-120018, Feb. 6-10, 2012, XP050562607, Dresden, Germany.

3GPP TSG-RAN WG1 Meeting #66, R1-112349, "HARQ Feedback Mechanism in CA with Different TDD Configurations", Proposed by MediaTek Inc., Athens, Greece, Aug. 22-26, 2011, http://www.3gpp.org/ftp/tsg_ran/wg1 _rl1/TSGR1_66/Docs/, p. 1-5.

3GPP TSG-RAN1 #68bis, R1-121201, "Motivation, requirements and design for ePHICH",Proposed by Fujitsu, Jeju, Korea, Mar. 26-30, 2012, http://www.3gpp.org/DynaReport/TDocExMtg--R1-68b--29001.htm, p. 1-4.

* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| Legacy UE | $N_{PHICH}^{group}$ | $N_{PHICH}^{group}$ | - | - | - | $N_{PHICH}^{group}$ | $N_{PHICH}^{group}$ | - | - | $N_{PHICH}^{group}$ |
| Advanced UE | $2N_{PHICH,new}^{group}$ | $2N_{PHICH,new}^{group}$ | - | - | - | $2N_{PHICH,new}^{group}$ | $2N_{PHICH,new}^{group}$ | - | - | - |
| Number of PHICH groups | $N_{PHICH}^{group}$ | $N_{PHICH}^{group}$ | - | - | - | $N_{PHICH}^{group}$ | $N_{PHICH}^{group}$ | - | - | - |
| Number of PHICH groups in the cPHICH | X | 0 | - | - | - | X | 0 | - | - | - |

FIG. 6

| UL/DL configuration | | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | Legacy UE | 0 | $N^{group}_{PHICH}$ | - | - | $N^{group}_{PHICH}$ | 0 | $N^{group}_{PHICH}$ | - | - | $N^{group}_{PHICH}$ |
| | Advanced UE | 0 | 0 | - | $N^{group}_{PHICII,new}$ | 0 | 0 | 0 | - | $N^{group}_{PIIICII,new}$ | 0 |
| | Number of PHICH groups in the PHICH | / | / | - | X1 | / | / | / | - | X1 | / |
| | Number of PHICH groups in the PDSCH | / | / | - | X2 | / | / | / | - | X2 | / |

FIG. 7

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| Legacy UE | $N_{PHICH}^{group}$ | $N_{PHICH}^{group}$ | - | - | - | $N_{PHICH}^{group}$ | $N_{PHICH}^{group}$ | - | - | $N_{PHICH}^{group}$ |
| Advanced UE | $2N_{PHICH,new}^{group}$ | $N_{PHICH,new}^{group}$ | - | - | - | $2N_{PHICH,new}^{group}$ | $N_{PHICH,new}^{group}$ | - | - | - |
| Number of PHICH groups | $N_{PHICH}^{group}$ | $N_{PHICH}^{group}$ | - | - | - | $N_{PHICH}^{group}$ | $N_{PHICH}^{group}$ | - | - | - |
| Number of PHICH groups in the ePHICH | $2N_{PHICH,new}^{group}$ | $N_{PHICH,new}^{group}$ | - | - | - | $2N_{PHICH,new}^{group}$ | $N_{PHICH,new}^{group}$ | - | - | - |

METHOD OF HANDLING HYBRID AUTOMATIC REPEAT REQUEST FEEDBACK AND RELATED COMMUNICATION DEVICE

CROSS REFERENCE TO RELATED APPLICATIONS

This application claims the benefit of U.S. Provisional Application No. 61/622,021, filed on Apr. 10, 2012 and entitled "Method for Assigning HARQ Indication Channel and Apparatus using the same", the contents of which are incorporated herein in their entirety.

BACKGROUND OF THE INVENTION

1. Field of the Invention

The present invention relates to a method used in a wireless communication system and related communication device, and more particularly, to a method of handling a hybrid automatic repeat request (HARQ) feedback and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system with frequency-division duplexing (FDD), transmission directions of subframes of a frequency band in the LTE/LTE-A system with time-division duplexing (TDD) may be different. That is, the subframes are divided into uplink (UL) subframes, downlink (DL) subframes and special subframes according to the UL/DL configuration specified in the 3GPP standard.

Figure 1:
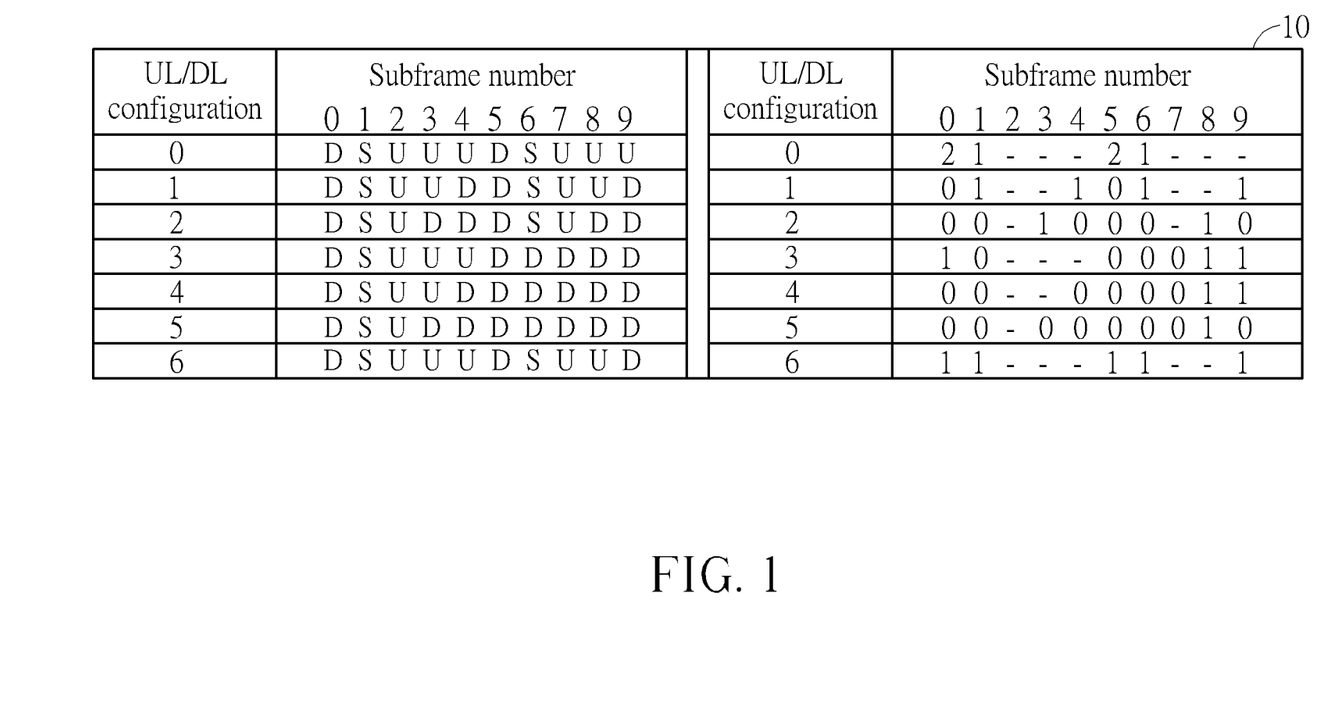
FIG. 1 is a table of the UL/DL configuration with corresponding factors m for numbers of PHICH groups.

Please refer to FIG. 1 which is a table 10 of the UL/DL configuration with corresponding factors m for numbers of physical HARQ indicator channel (PHICH) groups, wherein the number of PHICH groups for a specific subframe is determined as $m \cdot N_{PHICH}^{group}$. In FIG. 1, 7 UL/DL configurations are shown, wherein each of the UL/DL configurations indicating a set of transmission directions for 10 subframes, respectively. In detail, "U" means that the subframe is a UL subframe where UL data is transmitted, and "D" means that the subframe is a DL subframe where DL data is transmitted. "S" means that the subframe is a special subframe where control information is transmitted, and the special subframe can also be simply seen as the DL subframe in the present invention. Since a HARQ feedback corresponding to a UL transmission can only be transmitted in the DL subframes, the number of PHICH groups $m \cdot N_{PHICH}^{group}$ is only nonzero for the DL subframes and the special subframes as shown in FIG. 1.

Furthermore, a UL/DL configuration of a legacy UE can be changed according to System Information Block Type 1 (SIB1) transmitted by an eNB, e.g., from the UL/DL configuration 1 to the UL/DL configuration 3. A minimum periodicity of transmitting the SIB1 is usually large (e.g., 640 ms), and the legacy UE can only change the UL/DL configuration with the periodicity of 640 ms. The semi-statics allocation cannot match fast varying traffic characteristics and environments, and there is space for improving system performance. Thus, changing the UL/DL configuration with a lower periodicity (e.g., lower than 640 ms) is considered.

In general, the legacy UE is configured with a UL/DL configuration according to the SIB1, and this UL/DL configuration is also known by an advanced UE which is configured with an additional UL/DL configuration. The additional configuration is a real configuration operated by the eNB, and the eNB provides services (i.e., performs transmissions and/or receptions) to both the legacy UE and the advanced UE according to the additional configuration. For backward compatibility, the eNB may schedule the legacy UE to avoid accessing a subframe that is configured with different transmission directions due to the UL/DL configuration and the real UL/DL configuration. That is, when the advanced UE which can change the UL/DL configuration fast operates in the LTE/LTE-A system, it may happen that the advanced UE intends to receive a HARQ feedback in a subframe (i.e., DL subframe) while the subframe is the UL subframe for the legacy UE. For example, the advanced UE and the legacy UE are configured with the UL/DL configurations 2 and 3, respectively, and the advanced UE intends to receive the HARQ feedback in the subframe 3. If the eNB simply transmits HARQ feedbacks of the UEs, the advanced UE can receive its HARQ feedback while the legacy UE lose its HARQ feedback without any UL transmission.

Alternatively, the advanced UE may intend to receive the HARQ feedback in a subframe (i.e., DL subframe) which is also the DL subframe for the legacy UE. However, the number of PHICH groups $m \cdot N_{PHICH}^{group}$ for the advanced UE is greater than the number of PHICH groups $m \cdot N_{PHICH}^{group}$ for the legacy UE due to different UL/DL configurations of the UEs, wherein $N_{PHICH}^{group}$ is a basic number of the PHICH groups and is usually broadcasted in master information block (MIB) via a physical broadcast channel (PBCH). For example, the advanced UE and the legacy UE are configured with the UL/DL configurations 0 and 6, respectively, and the advanced UE intends to receive the HARQ feedback in the subframe 5. The HARQ feedback can not be arranged in the PHICH with $2N_{PHICH}^{group}$ PHICH groups corresponding to the UL/DL configuration 0 of the advanced UE, since the legacy UE detects the PHICH according to a detecting rule for $N_{PHICH}^{group}$ PHICH groups and operation of the legacy UE should not be affected. The above situations usually occur when the advanced UE changes its UL/DL configuration while the legacy UE does not.

Thus, how to receive the HARQ feedback when the conflict occurs due to different UL/DL configurations of the UEs is an important topic to be discussed.

SUMMARY OF THE INVENTION

The present invention therefore provides a method and related communication device for handling a HARQ Feedback to solve the abovementioned problem.

A method of handling a hybrid automatic repeat request (HARQ) feedback in a subframe for a first communication device in a wireless communication system is disclosed. The method comprises determining whether the HARQ feedback exists in a physical HARQ indicator channel (PHICH) in a downlink (DL) control region of the subframe transmitted by a network of the wireless communication system according to a first uplink (UL)/DL configuration of the first communication device and a second UL/DL configuration of a second communication device in the wireless communication system communicating with the network; detecting the HARQ feedback in the PHICH of the subframe, if the HARQ feedback exists in the PHICH; and detecting the HARQ feedback in an enhanced PHICH (ePHICH) of the subframe, if the HARQ feedback does not exist in the PHICH.

A method of handling a hybrid automatic repeat request (HARQ) feedback in a subframe for a network in a wireless communication system is disclosed. The method comprises determining whether the HARQ feedback is scheduled to exist in a physical HARQ indicator channel (PHICH) in a downlink (DL) control region of the subframe according to a first uplink (UL)/DL configuration of a first communication device in the wireless communication system and a second UL/DL configuration of a second communication device in the wireless communication system communicating with the network; arranging the HARQ feedback in the PHICH of the subframe, if the HARQ feedback is scheduled to exist in the PHICH; and arranging the HARQ feedback in an enhanced PHICH (ePHICH) of the subframe, if the HARQ feedback is not scheduled to exist in the PHICH.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
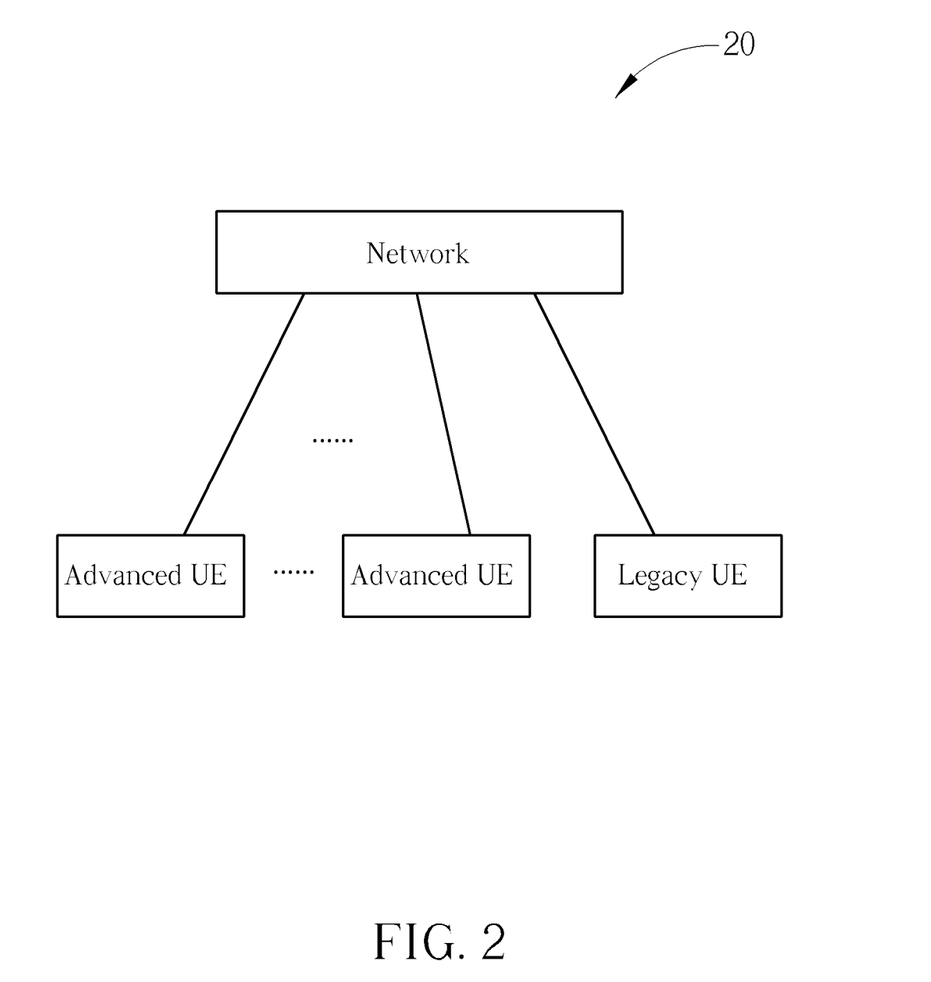
FIG. 2 is a schematic diagram of a wireless communication system according to an example the present invention.

Please refer to FIG. 2, which is a schematic diagram of a wireless communication system 20 according to an example of the present invention. The wireless communication system 20 is briefly composed of a network, an advanced equipment (UE) and a legacy UE. A minimum periodicity for changing an uplink (UL)/downlink (DL) configuration of the advanced UE is smaller than a minimum periodicity for changing a UL/DL configuration of the legacy UE. That is, the advanced UE can change its UL/DL configuration fast according to fast varying traffic characteristics and environments. Besides, the advanced UE know the UL/DL configuration of the legacy UE, e.g., according to System Information Block Type 1 (SIB1) transmitted by the network.

In FIG. 2, the network and the UEs are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE (advanced UE or legacy UE), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to transmission direction, e.g., for an uplink (UL), the UE is the transmitter and the network is the receiver, and for a downlink (DL), the network is the transmitter and the UE is the receiver.

Figure 3:
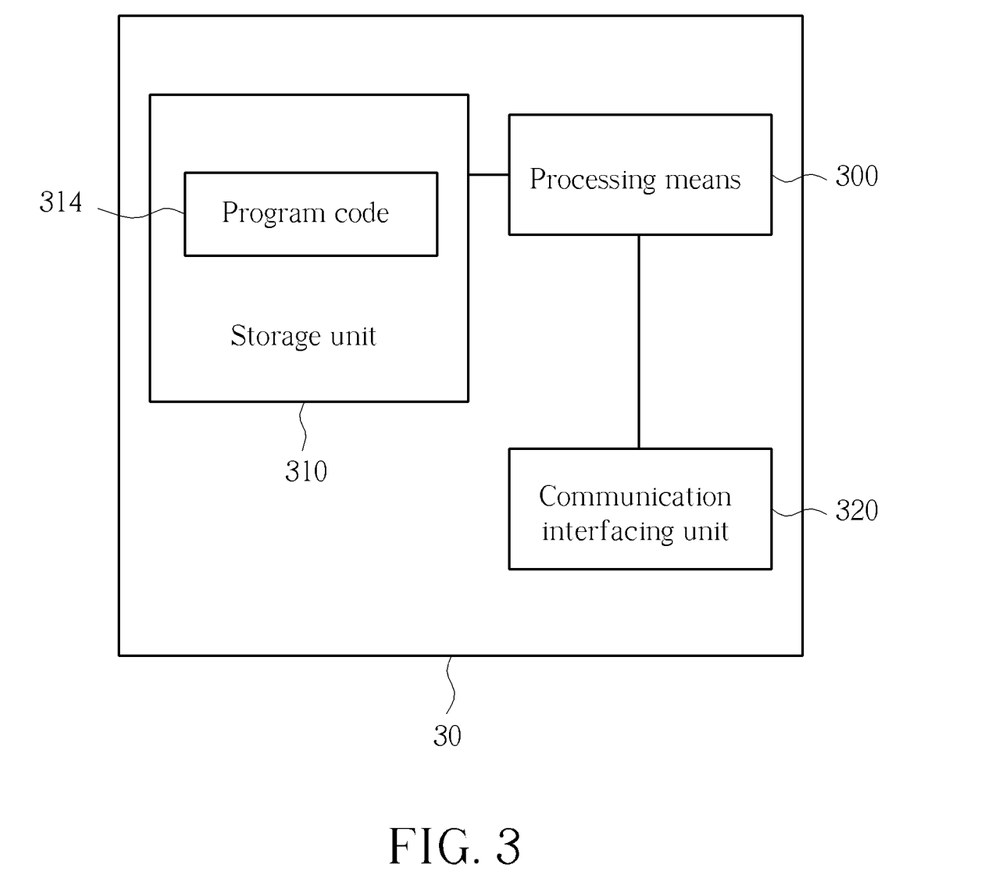
FIG. 3 is a schematic diagram of a communication device according to an example to the present invention.

Please refer to FIG. 3, which is a schematic diagram of a communication device 30 according to an example of the present invention. The communication device 30 can be the advanced UE, the legacy UE, or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
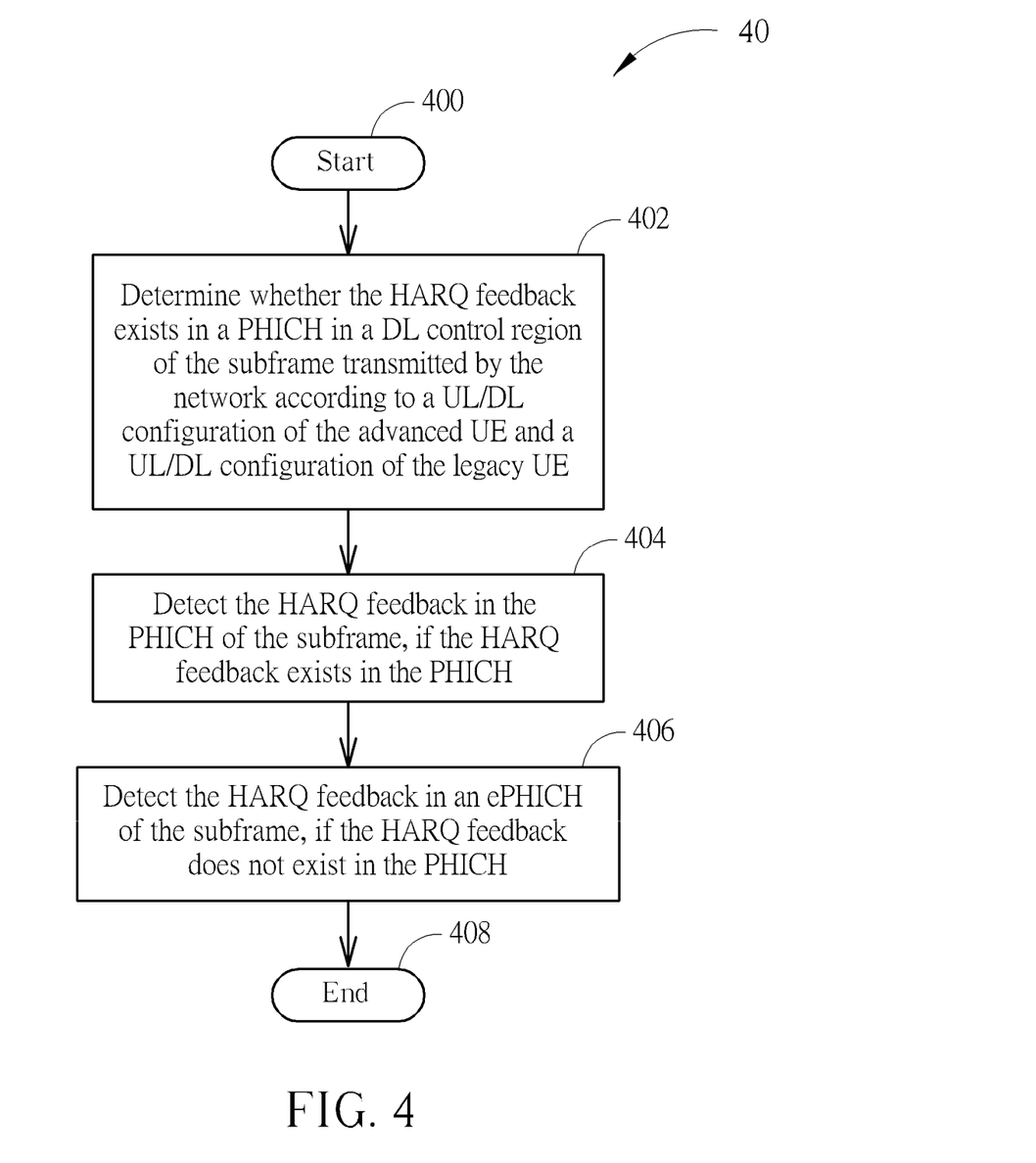
FIG. 4 is a flowchart of a process according to an example of the present invention.

Please refer to FIG. 4, which is a flowchart of a process 40 according to an example of the present invention. The process 40 is utilized the advanced UE shown in FIG. 2, for handling (e.g., detecting, demodulating and/or decoding) a hybrid automatic repeat request (HARQ) feedback in a subframe. The process 40 may be compiled into the program code 314 and includes the following steps:

Step 400: Start.

Step 402: Determine whether the HARQ feedback exists in a physical HARQ indicator channel (PHICH) in a DL control region of the subframe transmitted by the network according to a UL/DL configuration of the advanced UE and a UL/DL configuration of the legacy UE.

Step 404: Detect the HARQ feedback in the PHICH of the subframe, if the HARQ feedback exists in the PHICH.

Step 406: Detect the HARQ feedback in an enhanced PHICH (ePHICH) of the subframe, if the HARQ feedback does not exist in the PHICH.

Step 408: End.

According to the process 40, the advanced UE determines whether the HARQ feedback exists in a PHICH in a DL control region of the subframe transmitted by the network according to a UL/DL configuration of the advanced UE and a UL/DL configuration of the legacy UE. Then, the advanced UE detects the HARQ feedback in the PHICH of the subframe if the HARQ feedback exists in the PHICH, and detects the HARQ feedback in an ePHICH of the subframe if the HARQ feedback does not exist in the PHICH. That is, the HARQ feedback is arranged only in the PHICH or the ePHICH, such that the HARQ feedback can be transmitted by using sufficient resource. Since the conflict occurred due to different UL/DL configurations of the UEs is solved, the advance UE can change its UL/DL configuration fast according to fast varying traffic characteristics and environments while the legacy UE can still detect the HARQ feedback. Thus, performance of the wireless communication system can be improved.

Please note that, a method according to which the process 40 is realized is not limited. For example, the advanced UE can determine that the HARQ feedback does not exist in the PHICH, if a position of the HARQ feedback is outside the PHICH arranged according to the UL/DL configuration of the legacy UE. Besides, the advanced UE can determine the HARQ feedback does not exist in the PHICH, if the subframe is a UL subframe for the legacy UE. This can be seen as a result that the PHICH will not be arranged in the UL subframe, and the HARQ feedback is certainly outside the PHICH. The abovementioned situations may happen, when a number of at least one PHICH group of the subframe corresponding to the UL/DL configuration of the advanced UE is greater than a number of at least one PHICH group of the subframe corresponding to the UL/DL configuration of the legacy UE.

Figure 5:
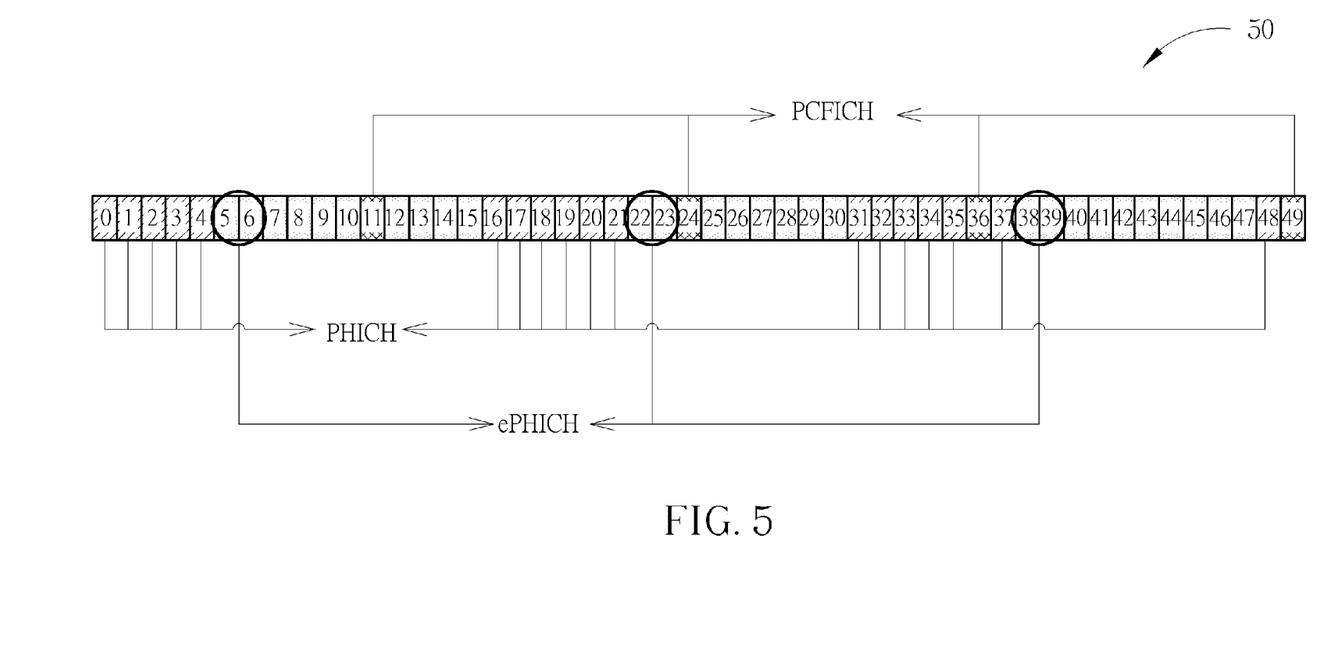
FIG. 5 is a schematic diagram of resource allocation according to an example the present invention.

On the other hand, an arrangement of the ePHICH is not limited. For example, the ePHICH may be arranged in a punctured part of the PDCCH of the subframe. Please refer to FIG. 5, which is a schematic diagram of resource allocation according to an example the present invention. In FIG. 5, 50 resource element groups (REGs) 0-49 are considered. In detail, a physical control format indicator channel (PCFICH) is arranged in the REGs 11, 24, 36 and 49, a PHICH channel is arranged in the REGs 0-4, 16-21, 31-35, 37 and 48, and a PDCCH is arranged in the REGs 5-10, 12-15, 22-23, 25-30 and 38-47. Further, the REGs 5-6, 22-23 and 38-49 are punctured, and are used for arranging the ePHICH. That is, part of the PDCCH is overwritten by using the ePHICH by the network. Since an amount of the part of the PDCCH can be controlled, the legacy UE can still detect (e.g., receive, demodulate and/or decode) the PDCCH correctly. Thus, the advanced UE can detect the HARQ feedback in the ePHICH of the subframe according to the above description, when the HARQ feedback does not exist in the PHICH of the subframe.

Figure 6:
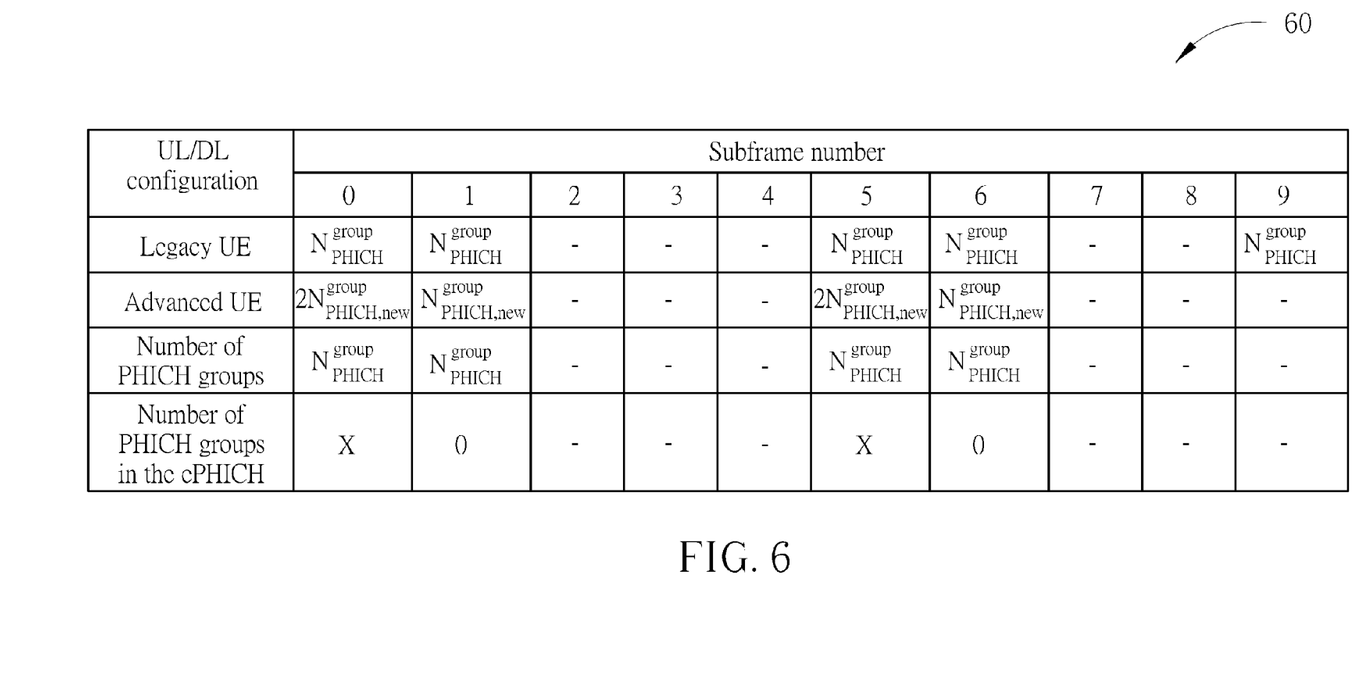
FIG. 6 is a table of the UL/DL configurations and number of PHICH groups according to an example to the present invention.

In another example, the ePHICH can be arranged in the PDSCH of the subframe, wherein a number of PHICH groups to be arranged in the ePHICH of the subframe is not limited. Please refer to FIG. 6, which is a table 60 of the UL/DL configurations and number of PHICH groups according to an example to the present invention. As shown in FIG. 6, the advanced UE and the legacy UE are configured with the UL/DL configurations 0 and 6, respectively. For example, if the advanced UE determines the HARQ feedback exists in the PHICH of the subframe 1 (or the subframe 6), e.g., $N_{PHICH,new}^{group} \leq N_{PHICH}^{group}$ or the position of the HARQ feedback is not outside the PHICH arranged according to the UL/DL configuration 6, the advanced UE detects the HARQ feedback in the PHICH of the subframe 1 (or the subframe 6) with $N_{PHICH,new}^{group}$ PHICH groups, wherein $N_{PHICH,new}^{group}$ is a (new) basic number of PHICH groups for the advanced UE. In another example, if the advanced UE determines the HARQ feedback does not exist in the PHICH of the subframe 0 (or the subframe 5), e.g., $2N_{PHICH,new}^{group} > N_{PHICH}^{group}$ and the position of the HARQ feedback is outside the PHICH arranged according to the UL/DL configuration 6, the advanced UE detects the HARQ feedback in the ePHICH of the subframe 0 (or the subframe 5).

As shown in FIG. 6, X PHICH groups in the ePHICH of the subframe 0 (or the subframe 5) are used for arranging the HARQ feedback, wherein $X = 2N_{PHICH,new}^{group} - N_{PHICH}^{group}$ in the present example, since only $N_{PHICH}^{group}$ PHICH groups in the PHICH can be used for arranged the HARQ feedback and $2N_{PHICH,new}^{group} - N_{PHICH}^{group}$ more PHICH groups are needed. Note that, $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH}^{group}$, or can be a newly defined value, and is not limited herein. $N_{PHICH,new}^{group}$ can be configured by a higher layer signaling. Alternatively, relation of $N_{PHICH,new}^{group} = yN_{PHICH}^{group}$ can be used, and y is configured by a higher layer signaling. In another example, it may be that $2N_{PHICH,new}^{group} \leq N_{PHICH}^{group}$ (and thus $N_{PHICH,new}^{group} \leq N_{PHICH}^{group}$), i.e., X=0, and the advanced UE only needs to detect the HARQ feedback in the PHICH of the subframe 0 (or the subframe 1, 5 or 6). Alternatively, it may be that the position of the HARQ feedback is not outside the PHICH while $2N_{PHICH,new}^{group} < N_{PHICH}^{group}$, the advanced UE only needs to detect the HARQ feedback in the PHICH of the subframe 0 (or the subframe 5). Thus, the advanced UE can detect the HARQ feedback in the ePHICH of the subframe according to the above description, when the HARQ feedback does not exist in the PHICH of the subframe. The subframes 2-4 and 7-9 are the UL subframes for the advanced UE, and are not considered in the present example.

Figure 7:
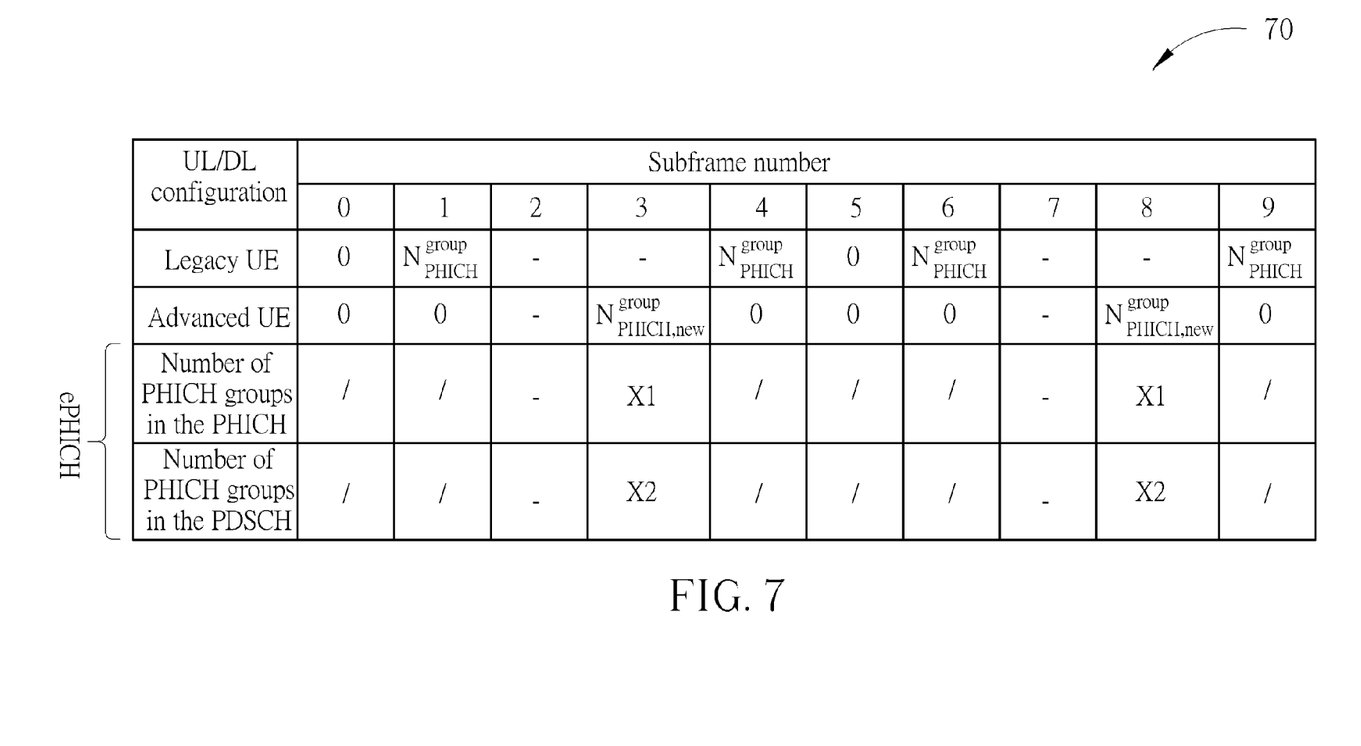
FIG. 7 is a table of the UL/DL configurations and number of PHICH groups according to an example to the present invention.

In another example, it may happen that a subframe is a DL subframe for the advance UE and is a UL subframe for the legacy UE, when the UL/DL configurations of the advanced UE and the legacy UE are different. In this situation, the ePHICH can be arranged more flexibly in the PHICH and the PDSCH of the subframe. Please refer to FIG. 7, which is a table 70 of the UL/DL configurations and number of PHICH groups according to an example to the present invention. As shown in FIG. 7, the advanced UE and the legacy UE are configured with the UL/DL configurations 2 and 1, respectively. The advanced UE determines the HARQ feedback does not exist in the PHICH of the subframe 3 (or the subframe 8), and detects the HARQ feedback in the ePHICH which is arranged in the PHICH and the ePHICH of the subframe 3 (or the subframe 8). The subframes 0-2, 4-7 and 9 are the UL subframes or the DL subframes without the HARQ feedback for the advanced UE, and are not considered in the present example.

Since the subframes 3 and 8 are the UL subframes for the legacy UE and the legacy UE will not detect the PHICH of the subframes 3 and 8, PHICH groups can be arranged in the PHICH and the PDSCH of the subframe flexibly. As shown in FIG. 7, $X1+X2=N_{PHICH,new}^{group}$ PHICH groups in the ePHICH of the subframe 3 (or the subframe 8) are used for arranged the HARQ feedback, wherein X1 is a number of PHICH groups arranged in the PHICH, and X2 is a number of PHICH groups arranged in the PDSCH. Note that X1 and/or X2 can be configured flexibly according to a higher layer signaling. For example, when X1 is configured as zero, i.e., $X2=N_{PHICH,new}^{group}$, the HARQ feedback is arranged in the ePHICH in the PDSCH. In another example, when X2 is configured as zero, i.e., $X1=N_{PHICH,new}^{group}$, the HARQ feedback is arranged in the ePHICH in the PHICH. Alternatively, when X1 and X2 are configured as positive integers, the HARQ feedback is arranged in the ePHICH in both the PHICH and the PDSCH. Note that $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH}^{group}$, or a newly defined value, and is not limited herein. $N_{PHICH,new}^{group}$ can be configured by a higher layer signaling. Alternatively, relation of $N_{PHICH,new}^{group}=yN_{PHICH}^{group}$ can be used, and y is configured by a higher layer signaling.

Figure 8:
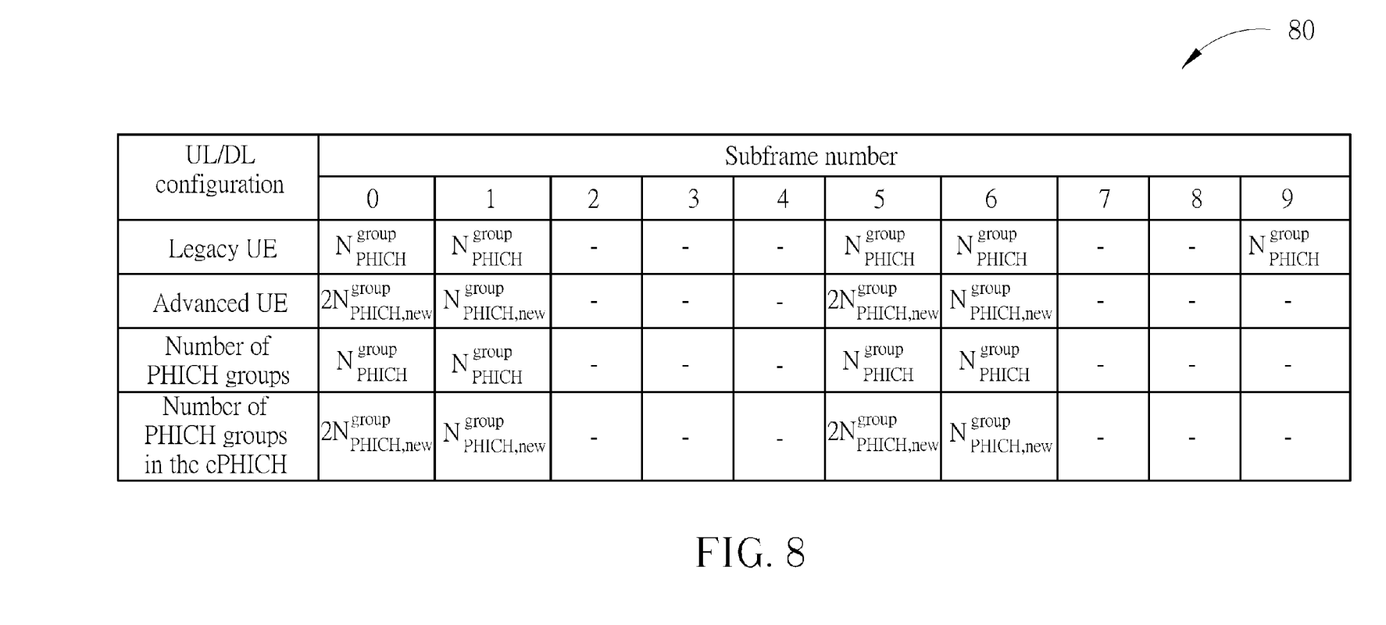
FIG. 8 is a table of the UL/DL configurations and number of PHICH groups according to an example to the present invention.

In another example, the advanced UE can always determine the HARQ feedback does not exist in the PHICH, to detect the HARQ feedback only in the ePHICH which is arranged in the PDSCH of the subframe. Please refer to FIG. 8, which is a table 80 of the UL/DL configurations and number of PHICH groups according to an example to the present invention. As shown in FIG. 8, the advanced UE and the legacy UE are configured with the UL/DL configurations 0 and 6, respectively. Different from the example shown in FIG. 6, the advanced UE always detects the HARQ feedback in the ePHICH in the PDSCH of the subframe. In detail, $2N_{PHICH,new}^{group}$ PHICH groups in the ePHICH of the subframe 0 (or the subframe 5) are used for arranging the HARQ feedback, and $N_{PHICH,new}^{group}$ PHICH groups in the ePHICH of the subframe 1 (or the subframe 6) are used for arranging the HARQ feedback. Note that, $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH,new}^{group}$, or can be a newly defined value, and is not limited herein. $N_{PHICH,new}^{group}$ can be configured by a higher layer signaling. Alternatively, relation of $N_{PHICH,new}^{group}=yN_{PHICH}^{group}$ can be used, and y is configured by a higher layer signaling. Thus, the advanced UE can detect the HARQ feedback only in the ePHICH of the subframe according to the above description. The subframes 2-4 and 7-9 are the UL subframes for the advanced UE, and are not considered in the present example.

The process 40 and the above description can be applied to the case of carrier aggregation (CA), when 2 UL/DL configurations which correspond to 2 component carriers configured to the advanced UE, respectively, are considered. In detail, the advanced UE performs an UL transmission via the first component carrier corresponding to the first UL/DL configuration, and intends to receive a HARQ feedback triggered by (i.e., corresponding to) the UL transmission in a subframe via the second component carrier corresponding to the second UL/DL configuration. Then, the advanced UE determines whether the HARQ feedback exists in a PHICH in a DL control region of the subframe transmitted by the network according to the first UL/DL configuration and the second UL/DL configuration of the advanced UE. The advanced UE detects (e.g., receives, demodulates and/or decodes) the HARQ feedback in the PHICH of the subframe if the HARQ feedback exists in the PHICH, and detects the HARQ feedback in an ePHICH of the subframe or in both the PHICH and the ePHICH of the subframe if the HARQ feedback does not exist in the PHICH. Whether the HARQ feedback exists in the PHICH can be determined according to the above description, and is not narrated herein.

Please note that, the advanced UE can obtain $N_{PHICH}^{group}$ and/or $N_{PHICH,new}^{group}$ via receiving system information or according to a predetermined rule (e.g., UE-specific configuration). Besides, the advanced UE can also determine whether the HARQ feedback exists in the PHICH according to a predetermined rule including determination results of different UL/DL configurations. Thus, the advanced UE does not need to compare the UL/DL configurations practically, and power consumption can be reduced.

Figure 9:
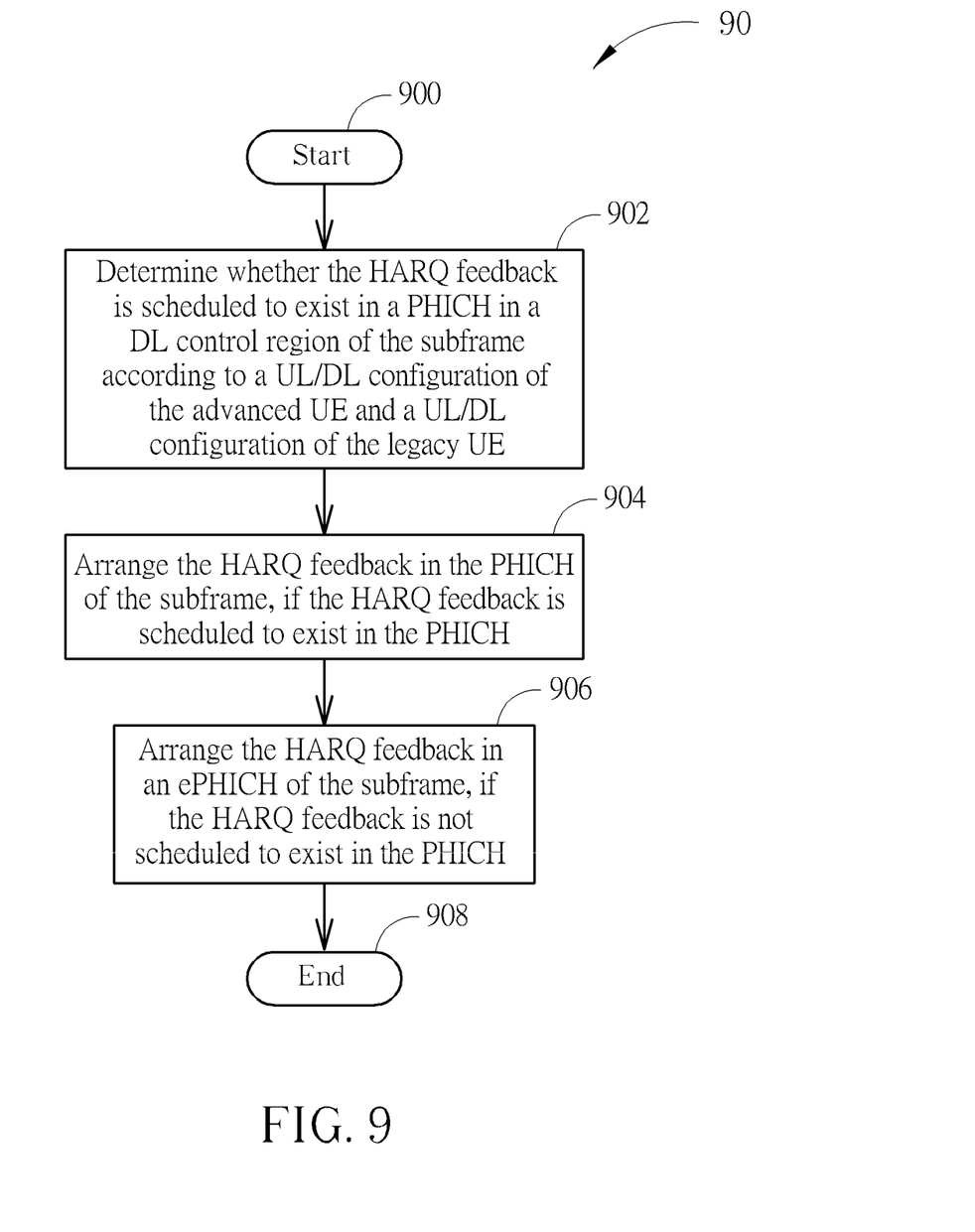
FIG. 9 is a flowchart of a process according to an example of the present invention.

Please refer to FIG. 9, which is a flowchart of a process 90 according to an example of the present invention. The process 90 is utilized the network shown in FIG. 2, for handling (e.g., arranging, modulating and/or encoding) a HARQ feedback in a subframe. Preferably, the process 90 can be seen as a process corresponding to the process 40, for the network to communicating with the advanced UE in which the process 40 is utilized. The process 90 may be compiled into the program code 314 and includes the following steps:

Step 900: Start.

Step 902: Determine whether the HARQ feedback is scheduled to exist in a PHICH in a DL control region of the subframe according to a UL/DL configuration of the advanced UE and a UL/DL configuration of the legacy UE.

Step 904: Arrange the HARQ feedback in the PHICH of the subframe, if the HARQ feedback is scheduled to exist in the PHICH.

Step 906: Arrange the HARQ feedback in an enhanced PHICH (ePHICH) of the subframe, if the HARQ feedback is not scheduled to exist in the PHICH.

Step 908: End.

According to the process 90, the network determines whether the HARQ feedback is scheduled to exist in a PHICH in a DL control region of the subframe according to a UL/DL configuration of the advanced UE and a UL/DL configuration of the legacy UE. Then, the network arranges (e.g., allocates) the HARQ feedback in the PHICH of the subframe if the HARQ feedback is scheduled to exist in the PHICH, and arranges the HARQ feedback in an ePHICH of the subframe if the HARQ feedback is not scheduled to exist in the PHICH. That is, the PHICH or the ePHICH is used for arranging the HARQ feedback. Since the conflict occurred due to different UL/DL configurations of the UEs is solved, the advance UE can change its UL/DL configuration fast according to fast varying traffic characteristics and environments while the legacy UE can still detect the HARQ feedback. Thus, performance of the wireless communication system can be improved.

Please note that, a method according to which the process 90 is realized is not limited. For example, the network can determine that the HARQ feedback is not scheduled to exist in the PHICH, if a position of the HARQ feedback is outside (e.g., no space inside for arranging the HARQ feedback) the PHICH arranged according to the UL/DL configuration of the legacy UE. Besides, the network can determine the HARQ feedback is not scheduled to exist in the PHICH, if the subframe is a UL subframe for the legacy UE. This can be seen as a result that the PHICH will not be arranged in the UL subframe, and the HARQ feedback is certainly outside the PHICH. The abovementioned situations may happen, when a number of at least one PHICH group of the subframe corresponding to the UL/DL configuration of the advanced UE is greater than a number of at least one PHICH group of the subframe corresponding to the UL/DL configuration of the legacy UE.

On the other hand, an arrangement of the ePHICH is not limited. For example, the network can arrange the ePHICH in a punctured part of the PDCCH of the subframe. Please refer back to FIG. 5, the network arranges a PCFICH in the REGs 11, 24, 36 and 49, arranges a PHICH channel in the REGs 0-4, 16-21, 31-35, 37 and 48, and arranges a PDCCH in the REGs 5-10, 12-15, 22-23, 25-30 and 38-47. Further, the network punctures the REGs 5-6, 22-23 and 38-49, and arranges the ePHICH in these REGs. That is, the network overwrites part of the PDCCH by using the ePHICH by the network. Since an amount of the part of the PDCCH can be controlled, the legacy UE can still detect (e.g., receive, demodulate and/or decode) the PDCCH correctly. Thus, the network can arrange the HARQ feedback in the ePHICH of the subframe according to the above description, when the HARQ feedback is not scheduled to exist in the PHICH of the subframe.

In another example, the network can arrange the ePHICH in the PDSCH of the subframe, wherein a number of PHICH groups to be arranged by the network in the ePHICH of the subframe is not limited. Please refer back to FIG. 6, if the network determines the HARQ feedback is scheduled to exist in the PHICH of the subframe 1 (or the subframe 6), e.g., $N_{PHICH,new}^{group} \leq N_{PHICH}^{group}$ or the position of the HARQ feedback can be inside the PHICH arranged according to the UL/DL configuration 6, the network arranges the HARQ feedback in the PHICH of the subframe 1 (or the subframe 6) with $N_{PHICH,new}^{group}$ PHICH groups, wherein $N_{PHICH,new}^{group}$ is a (new) basic number of PHICH groups for the advanced UE. In another example, if the network determines the HARQ feedback is not scheduled to exist in the PHICH of the subframe 0 (or the subframe 5), e.g., $2N_{PHICH,new}^{group} > N_{PHICH}^{group}$ and the position of the HARQ feedback is outside the PHICH arranged according to the UL/DL configuration 6, the network arranges the HARQ feedback in the ePHICH of the subframe 0 (or the subframe 5).

As shown in FIG. 6, X PHICH groups are used for arranging the HARQ feedback in the ePHICH of the subframe 0 (or the subframe 5), wherein $X=2N_{PHICH,new}^{group} - N_{PHICH}^{group}$ in the present example, since only $N_{PHICH}^{group}$ PHICH groups can be used for arranging the HARQ feedback in the PHICH and $2N_{PHICH,new}^{group} - N_{PHICH}^{group}$ more PHICH groups are needed. Note that, $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH}^{group}$ or can be a newly defined value, and is not limited herein. The network can configure $N_{PHICH,new}^{group}$ via a higher layer signaling. Alternatively, relation of $N_{PHICH,new}^{group} = y N_{PHICH}^{group}$ can be used, and the network can configure y via a higher layer signaling. In another example, it may be that $2N_{PHICH,new}^{group} \leq N_{PHICH}^{group}$ (and thus $N_{PHICH,new}^{group} \leq N_{PHICH}^{group}$) i.e., X=0, and the network only needs to arrange the HARQ feedback in the PHICH of the subframe 0 (or the subframe 1, 5 or 6). Alternatively, it may be that the position of the HARQ feedback can be inside the PHICH while $2N_{PHICH,new}^{group} > N_{PHICH}^{group}$, and the network only needs to arrange the HARQ feedback in the PHICH of the subframe 0 (or the subframe 5). Thus, the network can arrange the HARQ feedback in the ePHICH of the subframe according to the above description, when the HARQ feedback is not scheduled to exist in the PHICH of the subframe. The subframes 2-4 and 7-9 are the UL subframes for the advanced UE, and are not considered in the present example.

In another example, it may happen that a subframe is a DL subframe for the advance UE and is a UL subframe for the legacy UE, when the UL/DL configurations of the advanced UE and the legacy UE are different. In this situation, the ePHICH can be arranged more flexibly in the PHICH and the PDSCH of the subframe. Please refer back to FIG. 7, the network determines the HARQ feedback is not scheduled to exist in the PHICH of the subframe 3 (or the subframe 8), and arranges the HARQ feedback in the ePHICH which is arranged in the PHICH and the PDSCH of the subframe 3 (or the subframe 8). The subframes 0-2, 4-7 and 9 are the UL subframes or the DL subframes without the HARQ feedback for the advanced UE, and are not considered in the present example.

Since the subframes 3 and 8 are the UL subframes for the legacy UE and the legacy UE will not detect the PHICH of the subframes 3 and 8, PHICH groups can be arranged in the PHICH and the PDSCH of the subframe flexibly. As shown in FIG. 7, $X1+X2=N_{PHICH,new}^{group}$ PHICH groups in the ePHICH of the subframe 3 (or the subframe 8) are used for arranged the HARQ feedback, wherein X1 is a number of PHICH groups arranged in the PHICH, and X2 is a number of PHICH groups arranged in the PDSCH. Note that the network can configure X1 and/or X2 flexibly via a higher layer signaling. For example, when the network configures X1 as zero, i.e., $X2=N_{PHICH,new}^{group}$, the network will arrange the HARQ feedback in the ePHICH in the PDSCH. In another example, when the network configures X2 as zero, i.e., $X1=N_{PHICH,new}^{group}$, the network will arrange the HARQ feedback in the ePHICH in the PHICH. Alternatively, when the network configures X1 and X2 as positive integers, the network will arrange the HARQ feedback in the ePHICH in both the PHICH and the PDSCH. Note that $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH}^{group}$ or a newly defined value, and is not limited herein. The network can configure $N_{PHICH,new}^{group}$ via a higher layer signaling. Alternatively, relation of $N_{PHICH,new}^{group} = y N_{PHICH}^{group}$ can be used, and the network can configure y via a higher layer signaling.

In another example, the network can always determine the HARQ feedback is not scheduled to exist in the PHICH, to arrange the HARQ feedback only in the ePHICH which is arranged in the PDSCH of the subframe. Please refer back to FIG. 8, the network always arranges the HARQ feedback in the ePHICH in the PDSCH of the subframe. In detail, 2× PHICH groups in the ePHICH of the subframe 0 (or the subframe 5) are used for arranging the HARQ feedback, and $2N_{PHICH,new}^{group}$ PHICH groups in the ePHICH of the subframe 1 (or the subframe 6) are used for arranging the HARQ feedback. Note that, $N_{PHICH,new}^{group}$ can be $N_{PHICH}^{group}$ (i.e., $N_{PHICH}^{group}$ is used by the advanced UE for obtaining the number of PHICH groups), multiples of $N_{PHICH}^{group}$, or can be a newly defined value, and is not limited herein. The network can configure $N_{PHICH,new}^{group}$ via a higher layer signaling. Alternatively, relation of $N_{PHICH,new}^{group}=yN_{PHICH}^{group}$ can be used, and the network can configure y via a higher layer signaling. Thus, the network can arrange the HARQ feedback only in the ePHICH of the subframe according to the above description. The subframes 2-4 and 7-9 are the UL subframes for the advanced UE, and are not considered in the present example.

The process 90 and the above description can be applied to the case of CA, when 2 UL/DL configurations which correspond to 2 component carriers configured to the advanced UE, respectively, are considered. In detail, the network receives an UL transmission via the first component carrier corresponding to the first UL/DL configuration, and intends to transmit a HARQ feedback triggered by (i.e., corresponding to) the UL transmission in a subframe via the second component carrier corresponding to the second UL/DL configuration. Then, the network determines whether the HARQ feedback is scheduled to exist in a PHICH in a DL control region of the subframe according to the first UL/DL configuration and the second UL/DL configuration of the advanced UE. The network arranges (e.g., allocates) the HARQ feedback in the PHICH of the subframe if the HARQ feedback is scheduled to exist in the PHICH, and arranges the HARQ feedback in an ePHICH of the subframe or in both the PHICH and the ePHICH of the subframe if the HARQ feedback is not scheduled to exist in the PHICH. Whether the HARQ feedback is scheduled to exist in the PHICH can be determined according to the above description, and is not narrated herein.

Similarly, the network can also determine whether the HARQ feedback is scheduled to exist in the PHICH according to a predetermined rule including determination results of different UL/DL configurations. Thus, the network does not need to compare the UL/DL configurations practically, and power consumption can be reduced.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling a HARQ feedback. Since the conflict occurred due to different UL/DL configurations of the advanced UE and the legacy UE is solved, the advance UE can change its UL/DL configuration fast according to fast varying traffic characteristics and environments while the legacy UE can still detect the HARQ feedback. Thus, performance of the wireless communication system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a hybrid automatic repeat request (HARQ) feedback in a subframe for a first communication device in a wireless communication system according to a first uplink (UL)/downlink (DL) configuration and a second UL/DL configuration, the method comprising:
   determining whether the HARQ feedback exists in a physical HARQ indicator channel (PHICH) in a downlink (DL) control region of the subframe transmitted by a network of the wireless communication system according to the first UL/DL configuration of the first communication device and the second UL/DL configuration of a second communication device in the wireless communication system communicating with the network, wherein the first UL/DL configuration and the second UL/DL configuration are different;
   detecting the HARQ feedback in the PHICH of the subframe, if the HARQ feedback exists in the PHICH; and
   detecting the HARQ feedback in an enhanced PHICH (ePHICH) of the subframe, if the HARQ feedback does not exist in the PHICH;
   wherein the first communication device determines the HARQ feedback does not exist in the PHICH, if a position of the HARQ feedback is outside the PHICH arranged according to the second UL/DL configuration or the subframe is a UL subframe of the second communication device.

2. The method of claim 1, wherein the ePHICH is arranged in a punctured part of a physical DL control channel (PDCCH) in the DL control region of the subframe.

3. The method of claim 1, wherein the ePHICH is arranged in at least one of the PHICH and a physical DL shared channel (PDSCH) of the subframe.

4. The method of claim 1, wherein the first communication device always determines the HARQ feedback does not exist in the PHICH, to detect the HARQ feedback only in the ePHICH of the subframe.

5. The method of claim 1, wherein a first minimum periodicity for changing the first UL/DL configuration is smaller than a second minimum periodicity for changing the second UL/DL configuration.

6. The method of claim 1, wherein the first communication device and the second communication device are the same communication device, the first UL/DL configuration is corresponding to a first component carrier on which an UL transmission triggering the HARQ feedback is performed, and the second UL/DL configuration is corresponding to a second component carrier on which the HARQ feedback is transmitted.

7. The method of claim 1, wherein a basic number of PHICH groups for arranging the HARQ feedback is a newly defined value for the first communication device.

8. A method of handling a hybrid automatic repeat request (HARQ) feedback in a subframe for a network in a wireless communication system according to a first uplink (UL)/downlink (DL) configuration and a second UL/DL configuration, the method comprising:
   determining whether the HARQ feedback is scheduled to exist in a physical HARQ indicator channel (PHICH) in a downlink (DL) control region of the subframe according to the first UL/DL configuration of a first communication device in the wireless communication system and the second UL/DL configuration of a second communication device in the wireless communication system communicating with the network, wherein the first UL/DL configuration and the second UL/DL configuration are different;

arranging the HARQ feedback in the PHICH of the subframe, if the HARQ feedback is scheduled to exist in the PHICH; and arranging the HARQ feedback in an enhanced PHICH (ePHICH) of the subframe, if the HARQ feedback is not scheduled to exist in the PHICH;

wherein the network determines the HARQ feedback is not scheduled to exist in the PHICH, if a position of the HARQ feedback is outside the PHICH arranged according to the second UL/DL configuration or the subframe is a UL subframe of the second communication device.

9. The method of claim 8, wherein the network arranges the ePHICH in a punctured part of a physical DL control channel (PDCCH) in the DL control region of the PDCCH of the subframe.

10. The method of claim 8, wherein the network arranges the ePHICH in at least one of the PHICH and a physical DL shared channel (PDSCH) of the subframe.

11. The method of claim 8, wherein the network always determines the HARQ feedback is not scheduled to exist in the PHICH, to arrange the HARQ feedback only in the ePHICH of the subframe.

12. The method of claim 8, wherein a first minimum periodicity for changing the first UL/DL configuration is smaller than a second minimum periodicity for changing the second UL/DL configuration.

13. The method of claim 8, wherein the first communication device and the second communication device are the same communication device, the first UL/DL configuration is corresponding to a first component carrier on which an UL transmission triggering the HARQ feedback is performed, and the second UL/DL configuration is corresponding to a second component carrier on which the HARQ feedback is transmitted.

14. The method of claim 8, wherein a basic number of PHICH groups for arranging the HARQ feedback is a newly defined value for the first communication device.

* * * * *